United States Patent
Ito

(10) Patent No.: US 9,232,091 B2
(45) Date of Patent: Jan. 5, 2016

(54) IMAGE READER WITH BUTTON DISPLAY CONTROL, AND METHOD AND COMPUTER READABLE MEDIUM FOR THE SAME

(71) Applicant: Tomohiro Ito, Mizuho (JP)

(72) Inventor: Tomohiro Ito, Mizuho (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/018,573

(22) Filed: Sep. 5, 2013

(65) Prior Publication Data

US 2014/0071485 A1 Mar. 13, 2014

(30) Foreign Application Priority Data

Sep. 7, 2012 (JP) ................................ 2012-197226

(51) Int. Cl.
*H04N 1/00* (2006.01)

(52) U.S. Cl.
CPC ....... *H04N 1/00408* (2013.01); *H04N 1/00411* (2013.01); *H04N 1/00474* (2013.01); *H04N 1/00482* (2013.01)

(58) Field of Classification Search
CPC .......... H04N 1/00408; H04N 1/00474; H04N 1/00482; H04N 1/00411
See application file for complete search history.

(56) References Cited

U.S. PATENT DOCUMENTS

| 2005/0141026 | A1 | 6/2005 | Fujino | |
|---|---|---|---|---|
| 2008/0246211 | A1* | 10/2008 | Romanoff et al. | ............ 271/145 |
| 2009/0213405 | A1* | 8/2009 | Eguchi et al. | .......... G06Q 30/00 358/1.13 |
| 2009/0237699 | A1* | 9/2009 | Umezawa | .......... H04N 1/32561 358/1.13 |
| 2013/0077115 | A1* | 3/2013 | Ozaki | .......................... 358/1.13 |
| 2014/0153060 | A1* | 6/2014 | Takahashi | ..................... 358/468 |

FOREIGN PATENT DOCUMENTS

JP  2005-192022 A  7/2005

* cited by examiner

*Primary Examiner* — King Poon
*Assistant Examiner* — Andrew H Lam
(74) *Attorney, Agent, or Firm* — Scully, Scott, Murphy & Presser, P.C.

(57) ABSTRACT

An image reader is provided that includes an image reading unit, a display unit configured to display selection buttons for selecting an intended destination of image data, and a controller configured to, before a selection button corresponding to the intended destination is selected, control the display unit to display selectable selection buttons corresponding to accessible devices in a first display manner, the controller configured to, after the selection button corresponding to the intended destination is selected, control the display unit to display the selected selection button corresponding to the intended destination in a second display manner, control the display unit to display selectable selection buttons, other than the selected selection button, in the first display manner, and control the image reading unit to start an image reading operation.

18 Claims, 10 Drawing Sheets

IMAGE READER WITH BUTTON DISPLAY CONTROL, AND METHOD AND COMPUTER READABLE MEDIUM FOR THE SAME

CROSS-REFERENCE TO RELATED APPLICATION

This application claims priority under 35 U.S.C. §119 from Japanese Patent Application No. 2012-197226 filed on Sep. 7, 2012. The entire subject matter of the application is incorporated herein by reference.

BACKGROUND

1. Technical Field

The following description relates to one or more techniques for an image reader configured to acquire image data and transmit the acquired image data to an intended destination.

2. Related Art

An image reader has been known that is configured to acquire image data and transmit the acquired image data to an intended destination. The image reader is further configured to connect with a plurality of devices in wired and wireless manners. In addition, the image reader is provided with selection buttons for selecting the intended destination of the image data. When the intended destination is selected from among the plurality of devices via an operation of the selection buttons, the image data is transmitted to the selected device (the intended destination).

SUMMARY

As described above, the known image reader, which is configured to set the intended destination of the image data via the button operation, may have a plurality of selection buttons corresponding to respective accessible devices to which it is possible to transmit the image data. The image reader provided with the plurality of selection buttons has a problem that the more the number of the selection buttons is, the harder identifying a selection button corresponding to the intended destination is (i.e., the more the number of the selection buttons is, the less user-friendly the image reader is).

Aspects of the present invention are advantageous to present one or more improved techniques to provide a user-friendly image reader that even has a plurality of buttons.

According to aspects of the present invention, an image reader is provided, which includes an image reading unit configured to perform an image reading operation of reading an image of a document sheet and creating image data of the read image, a display unit configured to display a plurality of selection buttons corresponding to respective devices, each selection button being configured to, when selected, set a corresponding device as an intended destination of the image data, and a controller configured to control, before a selection button corresponding to the intended destination of the image data is selected, the display unit to display one or more selectable selection buttons of the plurality of selection buttons in a first display manner, the one or more selectable selection buttons corresponding to accessible devices to which it is possible to transmit the image data, and perform, after the selection button corresponding to the intended destination of the image data is selected, controlling the display unit to display the selected selection button corresponding to the intended destination of the image data in a second display manner different from the first display manner, controlling the display unit to display one or more selectable selection buttons, other than the selected selection button, in the first display manner, and controlling the image reading unit to start the image reading operation.

According to aspects of the present invention, further provided is a method configured to be implemented on a processor connected with an image reading unit configured to perform an image reading operation of reading an image of a document sheet and creating image data of the read image, and a display unit configured to display a plurality of selection buttons corresponding to respective devices, each selection button being configured to, when selected, set a corresponding device as an intended destination of the image data, the method including controlling, before a selection button corresponding to the intended destination of the image data is selected, the display unit to display one or more selectable selection buttons of the plurality of selection buttons in a first display manner, the one or more selectable selection buttons corresponding to accessible devices to which it is possible to transmit the image data, and performing, after the selection button corresponding to the intended destination of the image data is selected, controlling the display unit to display the selected selection button corresponding to the intended destination of the image data in a second display manner different from the first display manner, controlling the display unit to display one or more selectable selection buttons, other than the selected selection button, in the first display manner, and controlling the image reading unit to start the image reading operation.

According to aspects of the present invention, further provided is a non-transitory computer readable medium storing computer readable instructions configured to be executed by a processor connected with an image reading unit configured to perform an image reading operation of reading an image of a document sheet and creating image data of the read image, and a display unit configured to display a plurality of selection buttons corresponding to respective devices, each selection button being configured to, when selected, set a corresponding device as an intended destination of the image data, the instructions, when executed by the processor, causing the processor to control, before a selection button corresponding to the intended destination of the image data is selected, the display unit to display one or more selectable selection buttons of the plurality of selection buttons in a first display manner, the one or more selectable selection buttons corresponding to accessible devices to which it is possible to transmit the image data, and perform, after the selection button corresponding to the intended destination of the image data is selected, controlling the display unit to display the selected selection button corresponding to the intended destination of the image data in a second display manner different from the first display manner, controlling the display unit to display one or more selectable selection buttons, other than the selected selection button, in the first display manner, and controlling the image reading unit to start the image reading operation.

BRIEF DESCRIPTION OF THE ACCOMPANYING DRAWINGS

Figure 6:
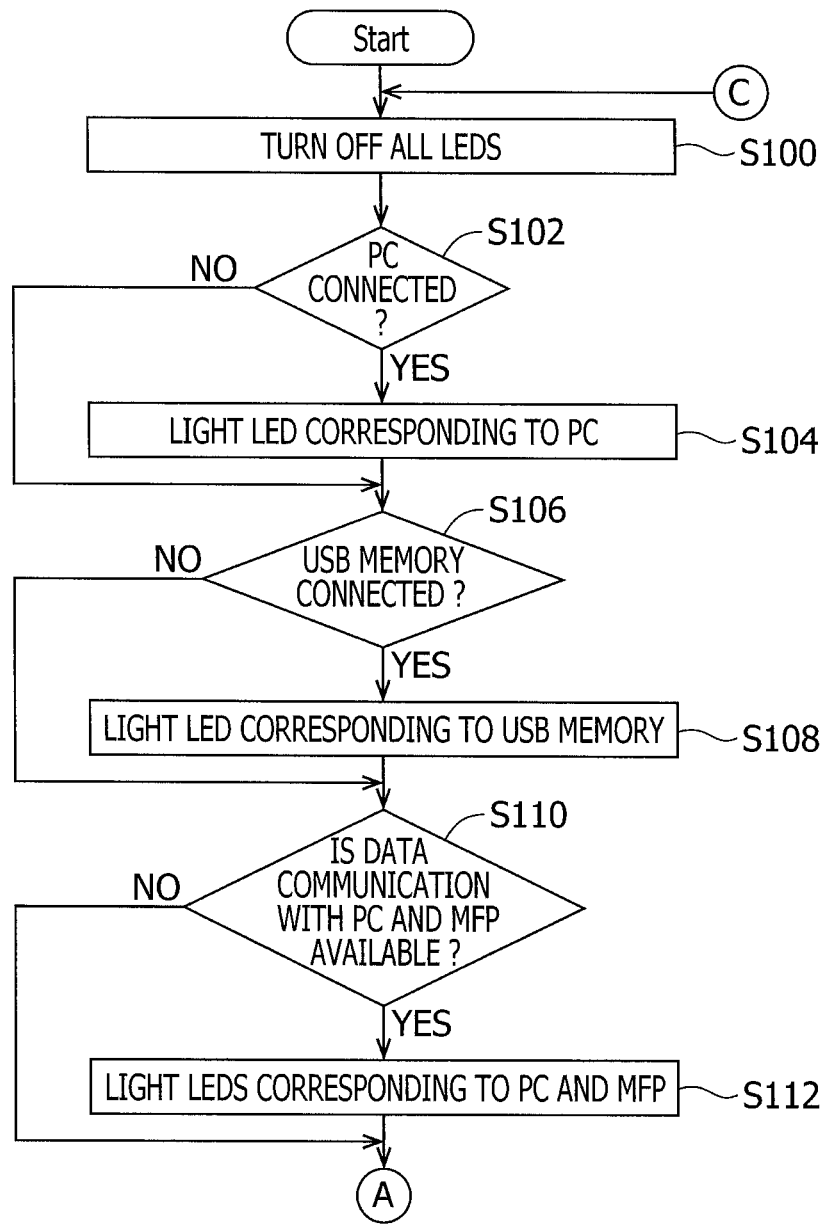
Figure 7:
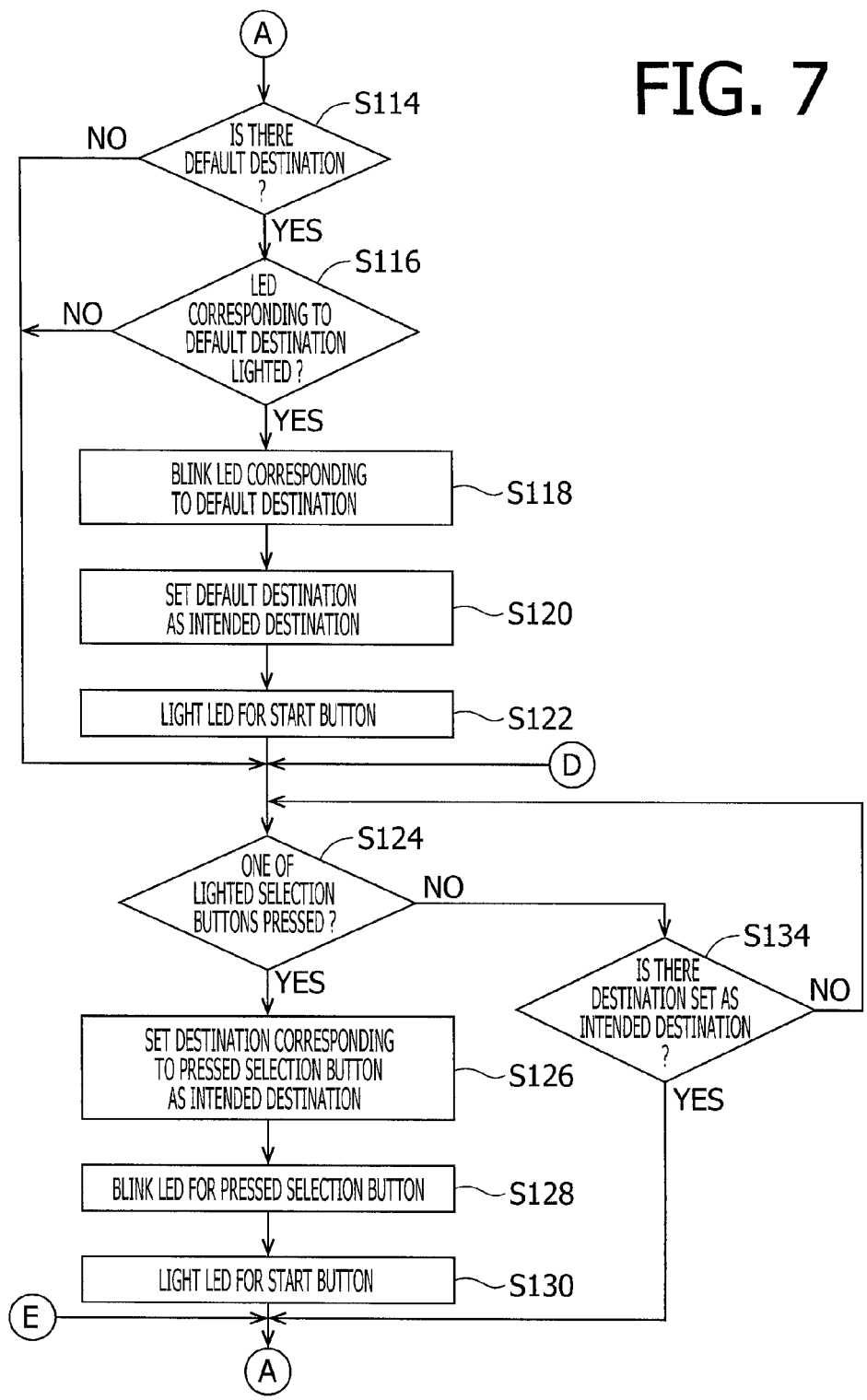
Figure 8:
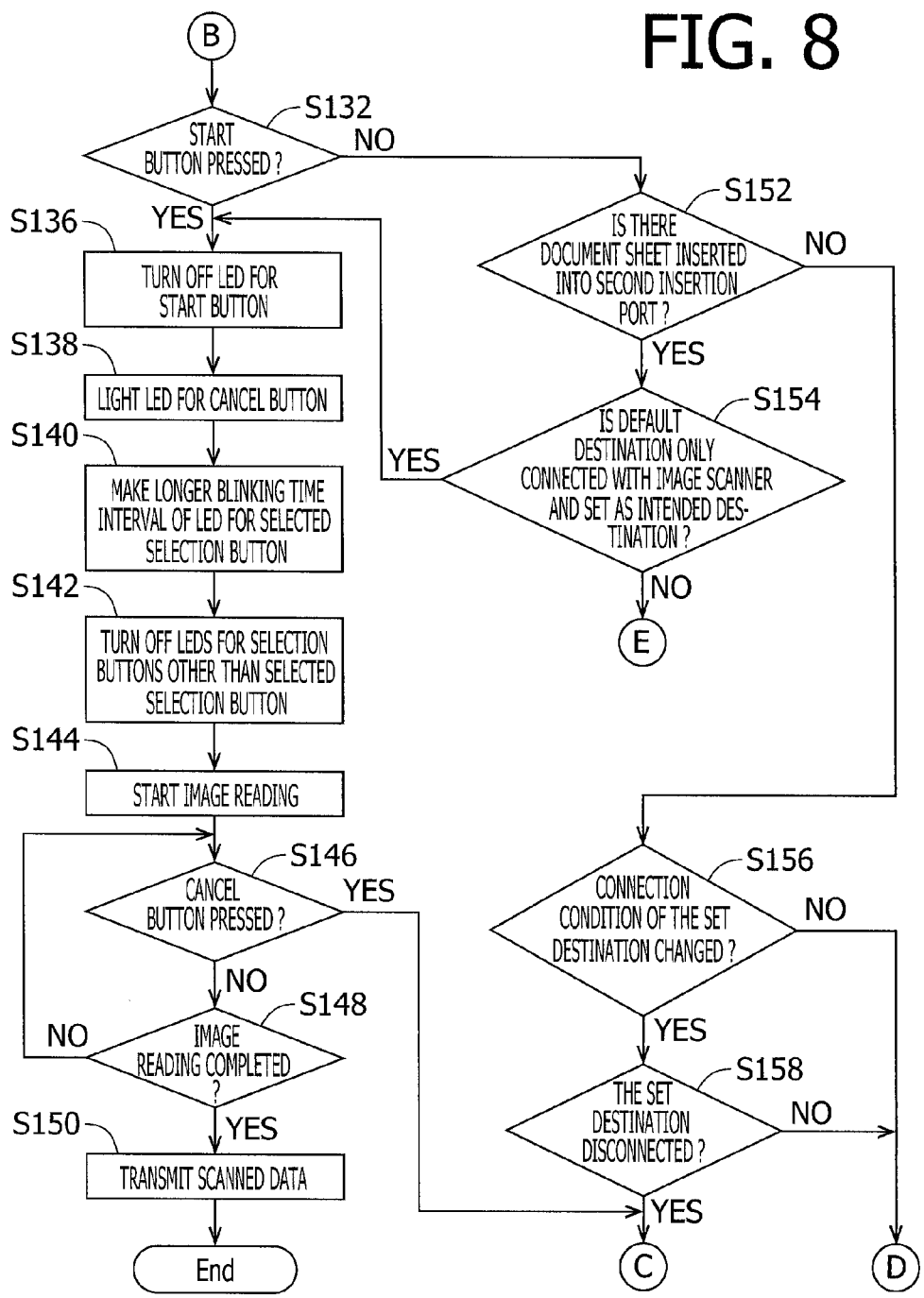

FIGS. 6, 7, and 8 are flowcharts showing a procedure of a process of acquiring scanned data from a document sheet and transmitting the acquired scanned data in the embodiment according to one or more aspects of the present invention.

FIGS. 9A, 9B, 10A, and 10B show respective different display manners of the touch panel in the embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented on circuits (such as application specific integrated circuits) or in computer software as programs storable on computer readable media including but not limited to RAMs, ROMs, flash memories, EEPROMs, CD-media, DVD-media, temporary storage, hard disk drives, floppy drives, permanent storage, and the like.

Hereinafter, an embodiment according to aspects of the present invention will be described with reference to the accompanying drawings.

<Embodiment>

Figure 1:
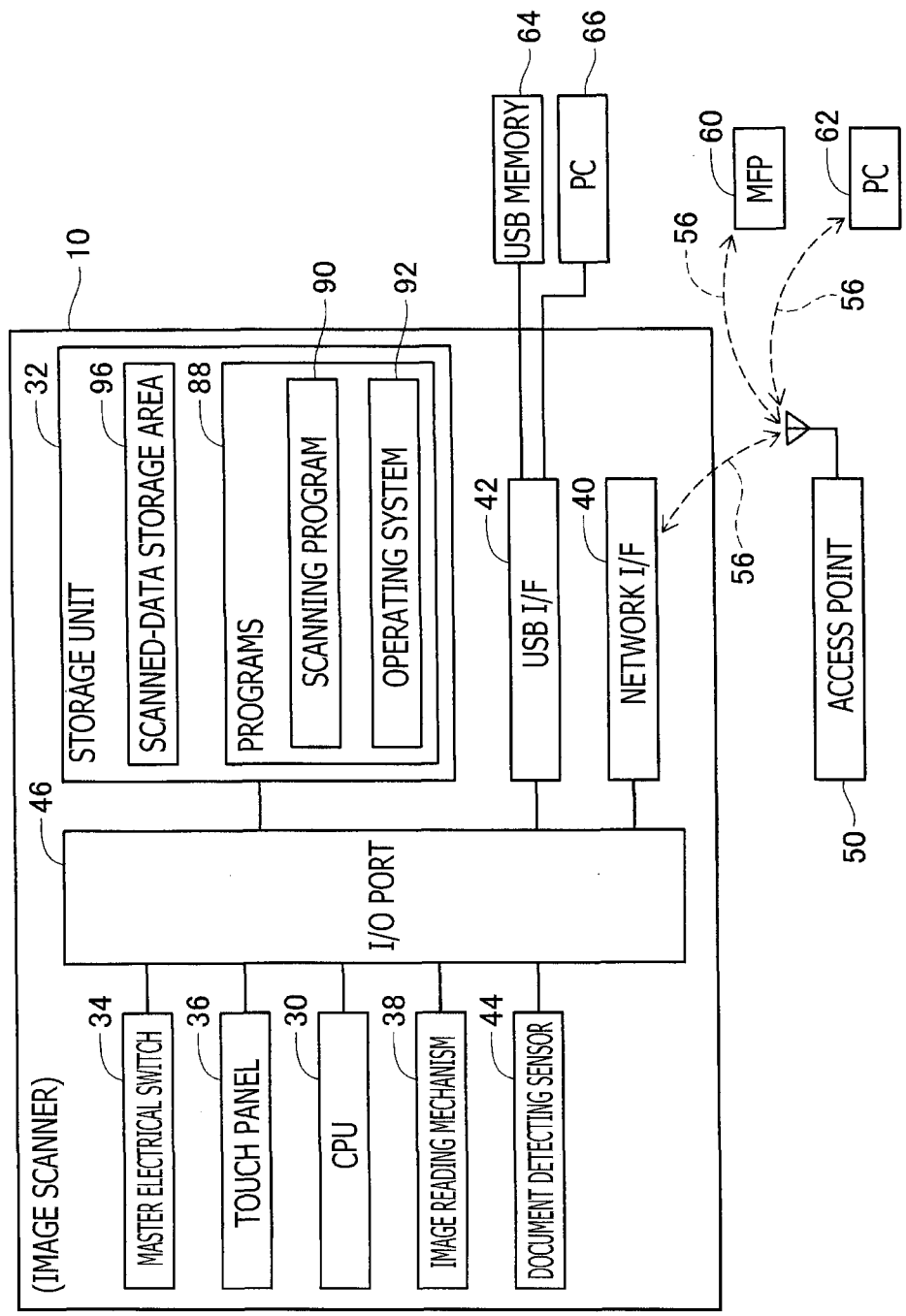
FIG. 1 is a block diagram showing a configuration of an image scanner in an embodiment according to one or more aspects of the present invention.
Figure 2:
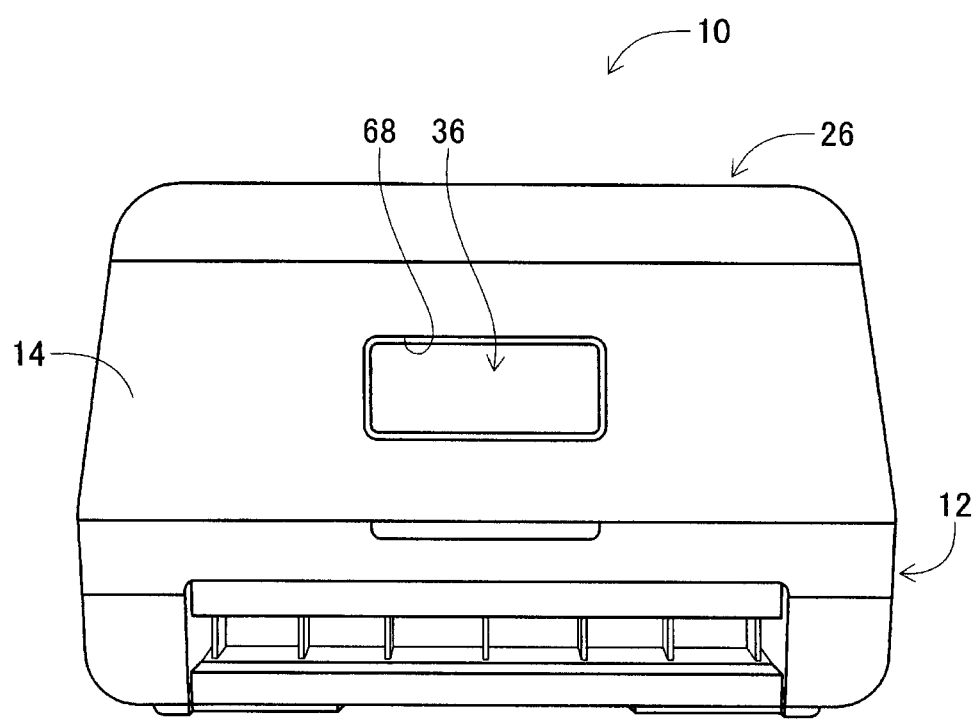
FIG. 2 is a perspective view of the image scanner in a state where a cover is closed in the embodiment according to one or more aspects of the present invention.
Figure 3:
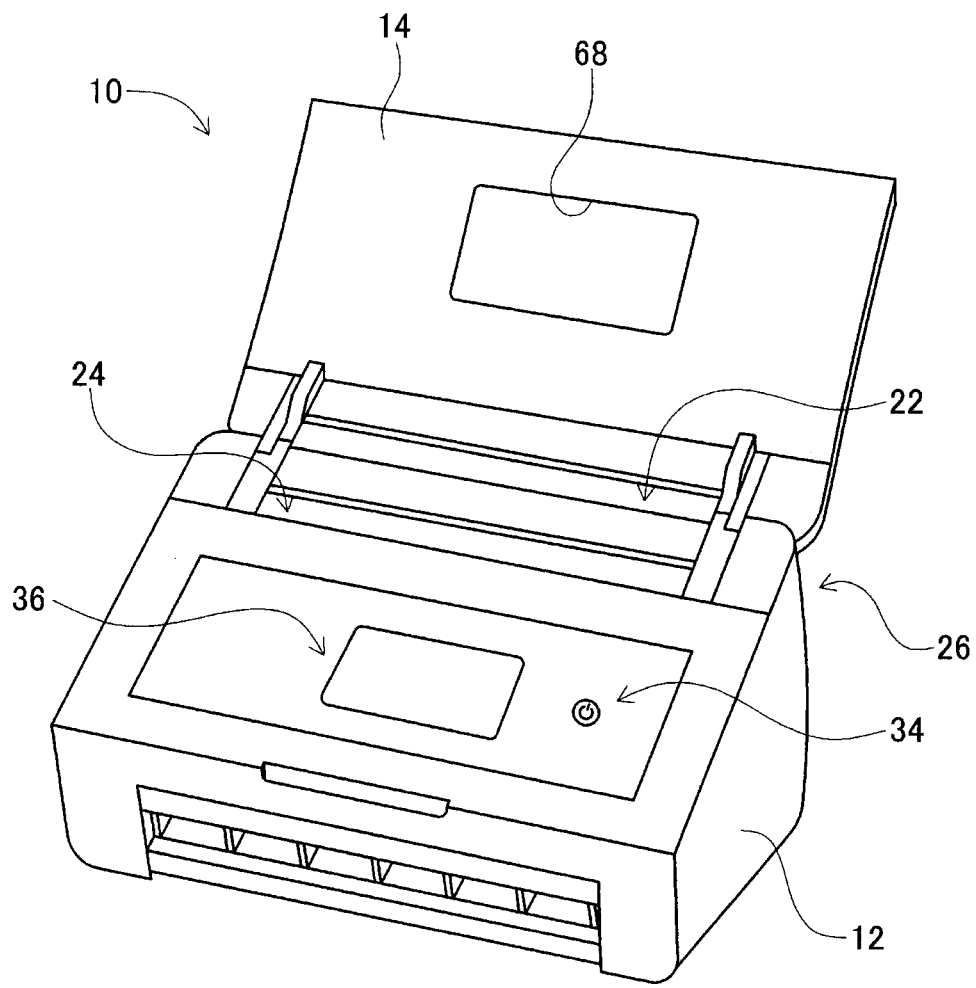
FIG. 3 is a perspective view of the image scanner in a state where the cover is open in the embodiment according to one or more aspects of the present invention.

FIG. 1 is a block diagram schematically showing a functional configuration of an image scanner 10 in an embodiment. FIGS. 2 and 3 are perspective views schematically showing an external configuration of the image scanner 10. As shown in FIGS. 2 and 3, the image scanner 10 includes a scanner main body 12 and a cover 14. The cover 14 is disposed on an upper side of the scanner main body 12 and configured to be open and closed with respective to the scanner main body 12. FIG. 2 is a perspective view of the image scanner 10 in a state where the cover 14 is closed. FIG. 3 is a perspective view of the image scanner 10 in a state where the cover 14 is open.

The image scanner 10 is configured to create scanned data by reading (scanning) a document sheet. As shown in FIG. 3, the image scanner 10 includes a document table 22 provided on an upper face of the scanner main body 12. The document table 22 is exposed when the cover 14 is open. A document sheet set on the document table 22 is inserted into the image scanner 10 through a first insertion port 24. Then, the image scanner 10 reads an image formed on the document sheet, and creates scanned data of the image. It is noted that the A4 size is a maximum size of readable document sheets allowed to be inserted via the first insertion port 24.

The image scanner 10 has a second insertion port 26 different from the first insertion port 24. The second insertion port 26 is disposed at a rear face side of the scanner main body 12. The second insertion port 26 is configured such that a document sheet is allowed to be inserted therethrough when the cover 14 is closed. It is noted that there is no document table for the second insertion port 26. Therefore, a document sheet held with a user's hand is inserted through the second insertion port 26. It is noted that the business-card size is a maximum size of readable document sheets allowed to be inserted via the second insertion port 26.

Further, the readable document sheets allowed to be inserted via the second insertion port 26 include a document sheet of a relatively hard material. Specifically, the readable document sheets allowed to be inserted via the second insertion port 26 include a business card and a credit card made of hard materials such as a thick paper and plastic. Meanwhile, the readable document sheets allowed to be inserted via the first insertion port 24 do not include any document sheet of hard material, but include a document sheet of soft materials such as a thin paper.

As shown in FIG. 1, the image scanner 10 includes a central processing unit (CPU) 30, a storage unit 32, a master electrical switch 34, a touch panel 36, an image reading mechanism 38, a network interface (I/F) 40, a USB I/F 42, and a document detecting sensor 44. These elements of the image sensor 10 are communicably interconnected via an input-output (I/O) port 46.

The image reading mechanism 38 includes a line image sensor, and is configured to create scanned data by reading a document sheet inserted through the first insertion port 24 or the second insertion port 26. The document detecting sensor 44 is disposed at the second insertion port 26, and is configured to detect whether there is a document sheet inserted through the second insertion port 26.

The network I/F 40 is configured to perform wireless communication 56 via an access point 50 (a known wireless LAN access point). The wireless communication 56 complies with a wireless LAN infrastructure mode (a mode in which a plurality of wireless LAN terminal devices perform data communication via an access point). A multi-function peripheral (MFP) 60 and a personal computer (PC) 62 are configured to perform the wireless communication 56, which complies with the wireless LAN infrastructure mode, via the access point 50. Namely, the image scanner 10 is allowed to send the scanned data to the MFP 60 and the PC 62 via the access point 50.

The USB I/F 42 is configured to connect with a USB memory 64 and a PC 66. Namely, the image scanner 10 is allowed to send the scanned data to the USB memory 64 and the PC 66.

Figure 4:
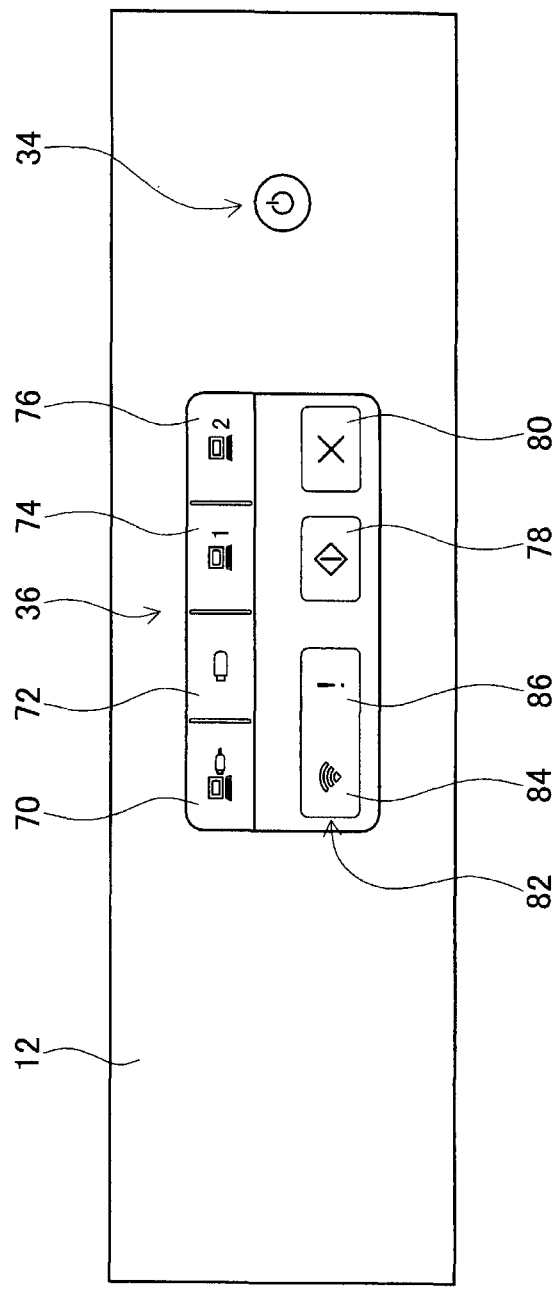
FIG. 4 is a front view showing a touch panel and a master electrical switch of the image scanner in the state where the cover is open in the embodiment according to one or more aspects of the present invention.

The touch panel 36 is for operating the image scanner 10. As shown in FIG. 3, the touch panel 36 is disposed on the upper face of the scanner main body 12. In addition, the master electrical switch 34 is disposed on the upper face of the scanner main body 12. Therefore, when the cover 14 is open, as shown in FIGS. 3 and 4, a user is allowed to visually recognize and operate the master electrical switch 34 and the touch panel 36. Nonetheless, the cover 14 includes an opening 68 formed to fit a shape of the touch panel 36. Thus, even the cover 14 is closed, as shown in FIGS. 2 and 5, the user is allowed to visually recognize and operate the touch panel 36 through the opening 68.

Figure 5:
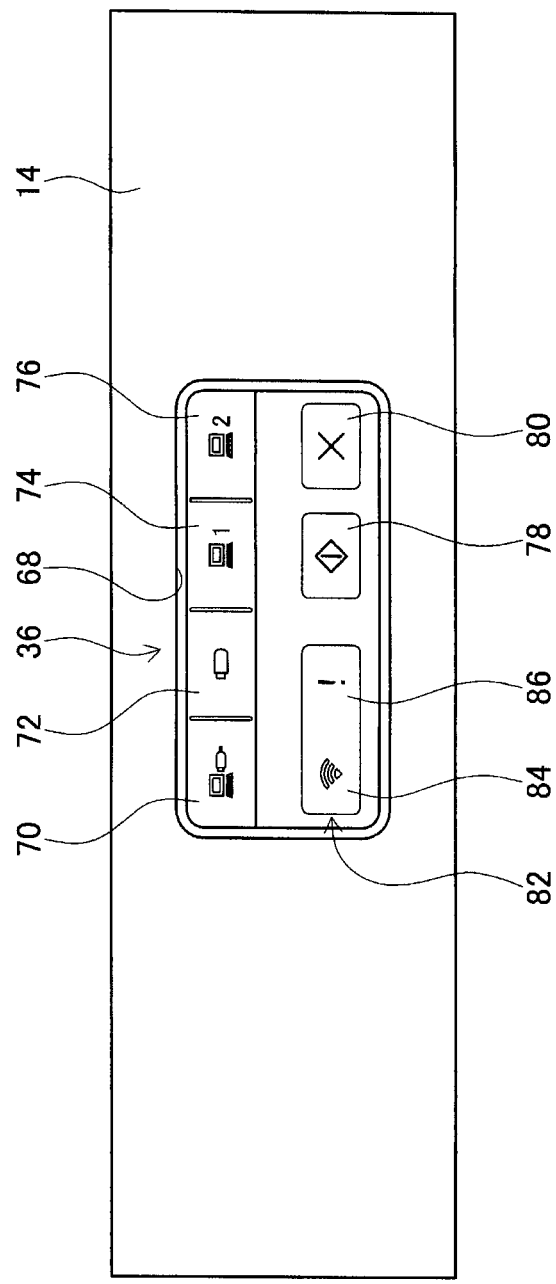
FIG. 5 is a front view showing the touch panel of the image scanner in the state where the cover is closed in the embodiment according to one or more aspects of the present invention.

As shown in FIGS. 4 and 5, the touch panel 36 includes four selection buttons 70, 72, 74, and 76, a start button 78, a cancel button 80, and a display unit 82. The four selection buttons 70, 72, 74, and 76 are for selecting a destination of the scanned data.

The selection button 70 is for selecting the PC 66 as a destination of the scanned data. The selection button 72 is for selecting the USB memory 64 as a destination of the scanned data. The selection button 74 is for selecting the MFP 60 as a destination of the scanned data. The selection button 76 is for selecting the PC 62 as a destination of the scanned data. The start button 78 is for starting image reading. The cancel button 80 is for stopping the image reading.

The plurality of buttons 70, 72, 74, 76, 78, and 80 are touch-sensitive buttons. There are LEDs (not shown) provided for the buttons 70, 72, 74, 76, 78, and 80, respectively. Each of the buttons 70, 72, 74, 76, 78, and 80 is displayed on the touch panel 36 with lighting of the corresponding LED, and is caused to disappear from (be not displayed on) the touch panel 36 with extinction of the corresponding LED. Further, each of the buttons 70, 72, 74, 76, 78, and 80 is displayed on the touch panel 36 in a manner blinking at time intervals. The blinking time interval for each LED is changeable.

The display unit 82 includes a communication state display portion 84 and an error display portion 86. The communication state display portion 84 is configured to display a state of the wireless communication 56, and to, when lighted, indicate that the wireless communication 56 is available. The error display portion 84 is configured to, when lighted, indicates occurrence of an error.

The storage unit 32 is configured to store programs 88 containing a scanning program 90 and an operating system 92. The scanning program is configured to cause the CPU 30 to perform an operation of transmitting to various devices the scanned data acquired by the image reading mechanism 38. The operating system 92 is configured to present basic functions to be used for the scanning program 90. The operating system 90 contains a program for causing the network I/F 40 to perform communication.

Further, the storage unit 32 includes a scanned-data storage area 96 configured to store scanned data acquired by the image reading mechanism 38. It is noted that the storage unit 32 includes a random access memory (RAM), a read only memory (ROM), a flash memory, a hard disk drive (HDD), and a buffer of the CPU 30.

The CPU 30 is configured to execute processes in accordance with the programs 88 stored on the storage unit 32. Hereinafter, a name of a program may be represented instead of the CPU 30 executing the program such as the scanning program 90 or the operating system 92. For example, an expression "the scanning program 90 performs some operations" may include a meaning "the CPU 30 executing the scanning program 90 performs some operations."

<Operations by Image Scanner>

Operations to be executed by the image scanner 10 in the embodiment will be described. The image scanner 10 is configured to perform a process of acquiring scanned data from a document sheet by the image reading mechanism 38 and transmitting the acquired scanned data to a predetermined device. Specifically, referring to FIGS. 6 to 8, an explanation will be provided about a flow of the process of acquiring scanned data from a document sheet by the image reading mechanism 38 and transmitting the acquired scanned data to a predetermined device.

In S100, the CPU 30 turns off all the LEDs corresponding to the plurality of buttons 70, 72, 74, 76, 78, and 80. Then, the CPU 30 goes to S102, in which the CPU 30 determines whether the USB I/F 42 is connected with the PC 66. When determining that the USB I/F 42 is connected with the PC 66 (S102: Yes), the CPU 30 goes to S104.

In S104, the CPU 30 lights the LED corresponding to the selection button 70 for selecting the PC 66 as a destination of the scanned data. Then, the CPU 30 goes to S106. Meanwhile, when determining that the USB I/F 42 is not connected with the PC 66 (S102: No), the CPU 30 goes to S106.

In S106, the CPU 30 determines whether the USB I/F 42 is connected with the USB memory 64. When determining that the USB I/F 42 is connected with the USB memory 64 (S106: Yes), the CPU 30 goes to S108. In S108, the CPU 30 lights the LED corresponding to the selection button 72 for selecting the USB memory 64 as a destination of the scanned data. Then, the CPU 30 goes to S110. Meanwhile, when determining that the USB I/F 42 is connected with the USB memory 64 (S106: No), the CPU 30 goes to S110.

In S110, the CPU 30 determines whether it is possible to perform data communication with the MFP 60 and the PC 62. When determining that it is possible to perform data communication with the MFP 60 and the PC 62 (S110: Yes), the CPU 30 goes to S112. In S112, the CPU 30 lights the LEDs corresponding to the selection buttons 74 and 76 for selecting the MFP 60 and the PC 62 as a destination of the scanned data, respectively. Then, the CPU 30 goes to S114. Meanwhile, when determining that it is not possible to perform data communication with the MFP 60 and the PC 62 (S110: No), the CPU 30 goes to S114.

Figure 9A:
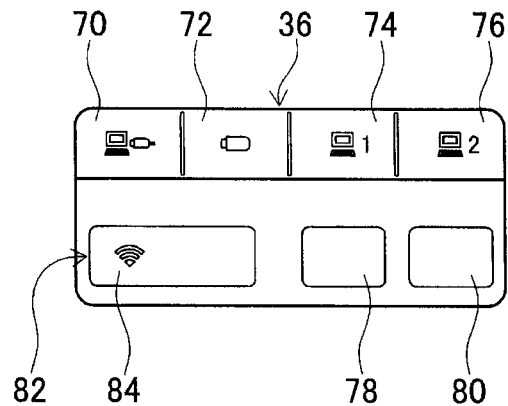

It is noted that, in the above process, when the USB I/F 42 is connected with the USB memory 64 and the PC 66, and the image scanner 10 is allowed to perform data communication with the MFP 60 and the PC 62, the selection buttons 70, 72, 74, and 76 are displayed on the touch panel 36, as shown in FIG. 9A.

In S114, the CPU 30 determines whether there is a default destination that is a previously-set destination to which the scanned data is to be preferentially transmitted. When determining that there is not a default destination (S114: No), the CPU 30 goes to S124. Meanwhile, when determining that there is a default destination (S114: Yes), the CPU 30 goes to S116.

In S116, the CPU 30 determines whether the LED corresponding to a specific selection button (of the selection buttons 70, 72, 74, and 76) for the default destination is lighted. Namely, the CPU 30 determines whether it is possible to transmit the scanned data to the default destination. When determining that the LED corresponding to the specific selection button for the default destination is not lighted (S116: No), the CPU 30 goes to S124. Meanwhile, when determining that the LED corresponding to the specific selection button for the default destination is lighted (S116: Yes), the CPU 30 goes to S118.

In S118, the CPU 30 blinks the LED corresponding to the specific selection button (of the selection buttons 70, 72, 74, and 76) for the default destination. Then, the CPU 30 goes to S120, in which the CPU 30 sets the default destination as an intended destination of the scanned data. Then, the CPU 30 goes to S122, in which the CPU 30 lights the LED corresponding to the start button 78. Then, the CPU 30 goes to S124.

In S124, the CPU 30 determines whether a specified one of selection buttons corresponding to lighted LEDs (of the selection buttons 70, 72, 74, and 76) has been pressed. When determining that a specified one of the selection buttons corresponding to the lighted LEDs has not been pressed (S124: No), the CPU 30 goes to S134. In S134, the CPU 30 determines whether there is a destination set as the intended destination of the scanned data. When determining that there is a destination set as the intended destination (S134: Yes), the CPU 30 goes to S132. Meanwhile, when determining that there is not a destination set as the intended destination (S134: No), the CPU 30 goes back to S124.

When determining that a specified one of the selection buttons corresponding to the lighted LEDs has been pressed (S124: Yes), the CPU 30 goes to S126. In S126, the CPU 30 sets a destination corresponding to the pressed selection button as the intended destination of the scanned data. Then, the CPU 30 goes to S128.

In S128, the CPU 30 blinks the LED corresponding to the pressed selection button. Then, the CPU 30 goes to S130, in which the CPU 30 lights the LED corresponding to the start button 78. Then, the CPU 30 goes to S132.

Figure 9B:
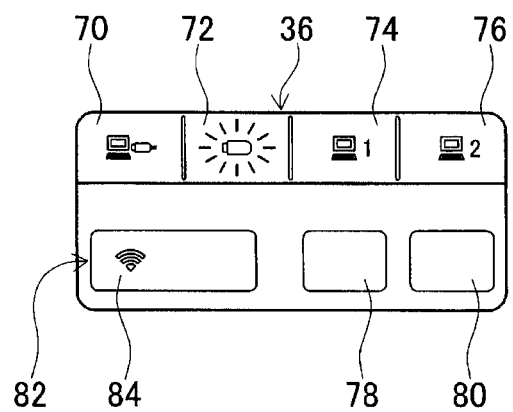
Figure 10A:
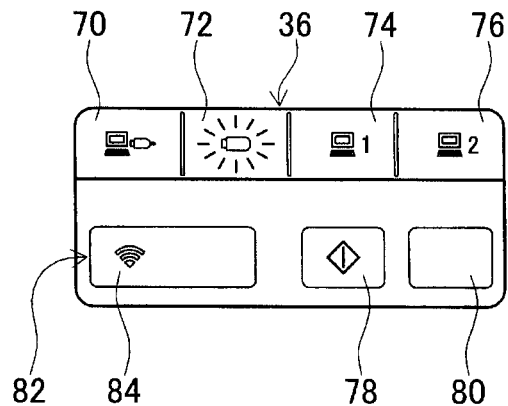

In the aforementioned steps, when either the default destination or the destination corresponding to the pressed selection button (of the selection buttons 70, 72, 74, and 76) is set as the intended destination of the scanned data, specifically, for example, when the USB memory 64 is set as the intended destination of the scanned data, as shown in FIG. 9B, the selection button 72 corresponding to the USB memory 64 is displayed blinking on the touch panel 36, and the other selection buttons 70, 74, and 76 are displayed lighted on the touch panel 36. Hereinafter, a specific example will be described. The CPU 30 maintains the lighted state of each LED corresponding to selection buttons, of the selection buttons 70, 74, and 76, which have been lighted since before the specified selection button is touched. The CPU 30 puts into a lighted state the LED corresponding to a selection button that has been blinking since before the specified selection button is touched. Further, as another specific example, the CPU 30 may turn off all the LEDs and then put into a lighted state each LED corresponding to selection buttons that had been lighted since before the specified selection button was touched and the LED corresponding to a selection button that had been blinking since before the specified selection button was touched. Then, as shown in FIG. 10A, the start button 78 is displayed on the touch panel 36.

In S132, the CPU 30 determines whether the start button 78 has been pressed. When determining that the start button 78 has been pressed (S132: Yes), the CPU 30 goes to S136. In S136, the CPU 30 turns off the LED corresponding to the start button 78. Then, the CPU 30 goes to S138, in which the CPU 30 lights the LED corresponding to the cancel button 80. Then, the CPU 30 goes to S140.

In S140, the CPU 30 makes longer a blinking time interval of the LED corresponding to the selected selection button 72. Then, the CPU 30 goes to S142, in which the CPU 30 turns off the LEDs corresponding to the selection buttons 70, 74, and 76 other than the selected selection button 72. Then, the CPU 30 goes to S144.

Figure 10B:
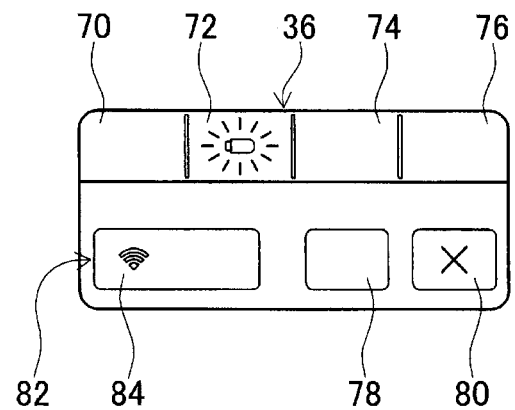

In the aforementioned steps, when the start button 78 is pressed, as shown in FIG. 10B, the start button 78 is caused to disappear from the touch panel 36, and the cancel button 80 is displayed on the touch panel 36. In addition, the blinking time interval of the selected selection button 72 is rendered longer, and the other selection buttons 70, 74, and 76 are caused to disappear from the touch panel 36.

In S144, the CPU 30 starts an image reading operation by the image reading mechanism 38. Then, the CPU 30 goes to S146, in which the CPU 30 determines whether the cancel button 80 has been pressed. When determining that the cancel button 80 has been pressed (S146: Yes), the CPU 30 goes back to S100. Meanwhile, when determining that the cancel button 80 has not been pressed (S146: No), the CPU 30 goes to S148.

In S148, the CPU 30 determines whether the image reading operation by the image reading mechanism 38 is completed. When determining that the image reading operation by the image reading mechanism 38 is not completed (S148: No), the CPU 30 goes back to S146. Meanwhile, when determining that the image reading operation by the image reading mechanism 38 is completed (S148: Yes), the CPU 30 goes to S150. In S150, the CPU 30 transmits the scanned data acquired in the image reading operation to the intended destination as set. Then, the CPU 30 terminates the process shown in FIGS. 6, 7, and 8.

Further, when determining that the start button 78 has not been pressed (S132: No), the CPU 30 goes to S152. In S152, the CPU 30 determines whether there is a document sheet inserted into the second insertion port 26. Specifically, the CPU 30 detects, using the document detecting sensor 44, whether there is a document sheet inserted into the second insertion port 26. When determining that there is a document sheet inserted into the second insertion port 26 (S152: Yes), the CPU 30 goes to S154.

In S154, the CPU 30 determines whether the default destination is only connected with the image scanner 10. Further, when determining that the default destination is only connected with the image scanner 10, the CPU 30 determines whether the default destination is set as the intended destination of the scanned data. When determining that the default destination is set as the intended destination of the scanned data (S154: Yes), the CPU 30 goes to S136, and executes the following steps as described above.

Meanwhile, when determining that the default destination is not only connected with the image scanner 10, or when determining that the default destination is only connected with the image scanner 10, but the default destination is not set as the intended destination of the scanned data (S154: No), the CPU 30 goes back to S132.

Further, when determining that there is not a document sheet inserted into the second insertion port 26 (S152: No), the CPU 30 goes to S156. In S156, the CPU 30 determines whether there is a change in a connection condition of the set destination. When determining that there is not a change in the connection condition of the set destination (S156: No), the CPU 30 goes back to S124. Meanwhile, when determining that there is a change in the connection condition of the set destination (S156: Yes), the CPU 30 goes to S158.

In S158, the CPU 30 determines whether the set destination is disconnected from the image scanner 10. When determining that the set destination is not disconnected from the image scanner 10 (S158: No), the CPU 30 goes back to S124. Meanwhile, when determining that the set destination is disconnected from the image scanner 10 (S158: Yes), the CPU 30 goes back to S100.

<Advantageous Effects>

In the image scanner 10 of the embodiment, as shown in FIG. 9A, the selection buttons 70, 72, 74, and 76 corresponding to the devices to which the scanned data is allowed to be transmitted are displayed on the touch panel 36 (S100 to S112). Thereby, the user is allowed to select the destination from among the devices to which the scanned data is allowed to be transmitted.

Further, when the destination of the scanned data is set, as shown in FIG. 9B, the selection button 72 corresponding to the USB memory 64, which is an example of the set destination, is displayed in a blinking state (S118 and S128), and the other selection buttons 70, 74, and 76 are displayed in a lighted state. Namely, the selection buttons corresponding to the devices not set as the intended destination are displayed in a first display manner, and the selection button corresponding to the device set as the intended destination is displayed in a second display manner different from the first display manner. Thereby, the user is allowed to easily recognize the destination of the scanned data. It is noted that a display manner of each selection button displayed in the first display manner may be maintained in a state before the destination of the scanned data is set. Alternatively, each selection button displayed in the first display manner may be caused to once disappear from the touch panel 36 after the destination of the scanned data is set, and afterward, may be displayed again.

Further, when there is a default destination previously set with respect to the destination of the scanned data (S114: Yes), the default destination is set as the intended destination of the scanned data without any selection button 70, 72, 74, or 76 being pressed (S120). Thereby, it is possible to simplify user's operations for setting the intended destination of the scanned data.

Further, after the intended destination of the scanned data is set, as shown in FIG. 10A, the start button 78 is displayed on the touch panel 36 (S122 and S130). Thereby, it is possible to cause the start button 78 to be displayed only when needed, and to enhance user-friendliness of the image scanner 10.

Further, after the start button 78 is operated, that is, after an instruction to perform the image reading operation is issued, as shown in FIG. 10B, the start button 78 is caused to disappear from the touch panel 36 (S136). Thereby, it is possible to forbid the button not to be operated from being displayed on the touch panel 36.

Further, after the start button 78 is operated, that is, after the instruction to perform the image reading operation is issued, as shown in FIG. 10B, the cancel button 80 is displayed on the touch panel 36 (S138). Thereby, it is possible to cause the cancel button 80 to be displayed only when needed, and to further enhance the user-friendliness of the image scanner 10.

Further, after the start button 78 is operated, that is, after the instruction to perform the image reading operation is issued, the blinking time interval of the selection button 72 corresponding to the set destination is changed (S140). In other words, the selected selection button, which has been displayed in the second display manner, is caused to be displayed in a third display manner different from the second display manner. Thereby, the user is allowed to easily realize that the image scanner 10 is performing the image reading operation or transmitting the scanned data.

Further, after the start button 78 is operated, that is, after the instruction to perform the image reading operation is issued, as shown in FIG. 10B, the selection buttons 70, 74, and 76, other than the selection button 72 corresponding to the set destination, is caused to disappear from the touch panel 36 (S142). Thereby, the user is allowed to certainly recognize the intended destination of the scanned data.

It is noted that "after the instruction to perform the image reading operation is issued" represents "after a signal of the instruction to perform the image reading operation is issued," and may contain moments before and after entry of the signal. Further, the instruction to perform the image reading operation may be issued by an operation of the start button 78 or by another method. Furthermore, "after the instruction to perform the image reading operation is issued" may be defined regardless of whether the image reading operation is actually performed, and may contain moments before and after start of the image reading operation.

Further, a document sheet inserted through the first insertion port 24 is read (scanned) when the start button 78 is operated (S132: Yes). Meanwhile, a document sheet inserted through the second insertion port 26 is read (scanned) even though the start button 78 is not operated in the case where a predetermined condition is satisfied (S154: Yes). Namely, the image reading operation is started only by the document sheet being inserted through the second insertion port 26. Thereby, it is possible to enhance user-friendliness in the image reading operation for scanning the document sheet inserted through the second insertion port 26. In particular, since the second insertion port 26 receives therethrough a document sheet held by a user's hand, execution of the image reading operation in response to insertion of the document sheet through the second insertion port 26 is effective to improve the user-friendliness.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible. It is noted that, in the following modifications, explanations of the same configurations as exemplified in the aforementioned embodiment will be omitted.

[Modifications]

In the aforementioned embodiment, the various buttons 70, 72, 74, 76, 78, and 80 are touch-sensitive buttons. However, the various buttons 70, 72, 74, 76, 78, and 80 may be configured to accept an input operation via a member thereof, such as pressing the member, touching the member, or putting a user's bodily part close to the member. Further, the various buttons 70, 72, 74, 76, 78, and 80 may be operable elements such as members referred to as keys.

Further, in the aforementioned embodiment, the first display manner is the lighted state. In addition, the second display manner and the third display manner are the blinking states having respective different blinking time intervals. However, the first to third display manners are not limited to the above states. However, the first to third display manners may be states having respective different display conditions such as different colors and different degrees of brightness.

The aforementioned embodiment provides an example where the CPU 30 executes various operations based on the scanning programs 90. However, the CPU 30 may issue, based on the scanning program 90, instructions to cause other elements (such as the operating system 92, other systems, and hardware elements) to execute various operations.

Each program exemplified in the aforementioned embodiment may include only a single program module, or may include a plurality of program modules. Each configuration exemplified in the aforementioned embodiment may a replaceable different configuration. Aspects of the present invention may be achieved by, as well as the CPU 30 executing the scanning program 90, various configurations such as a computer executing a program (e.g., the operating system 92 and an application program) other than the scanning program 90, a hardware element (e.g., the image reading mechanism 38) operating in accordance with instructions from a computer, a configuration of a computer and a hardware element that operate in collaboration with each other, a computer executing a plurality of programs in collaboration with each other, and a hardware configuration that operates in accordance with instructions from a computer executing a plurality of programs in collaboration with each other.

What is claimed is:

1. An image reader comprising:
an image reading unit configured to perform an image reading operation of reading an image of a document sheet and creating image data of the read image;
a display unit configured to display a plurality of selection buttons corresponding to respective devices, each selection button being configured to, when selected, set a corresponding device as an intended transmission destination of the image data of the read image; and
a controller configured to:
control, before a selection button corresponding to the intended transmission destination of the image data of the read image is selected, the display unit to display one or more selectable selection buttons of the plurality of selection buttons in a first display manner, the one or more selectable selection buttons corresponding to accessible devices to which it is possible to transmit the image data of the read image; and
perform, after the selection button corresponding to the intended transmission destination of the image data of the read image is selected,
controlling the display unit to display the selected selection button corresponding to the intended transmission destination of the image data of the read image in a second display manner different from the first display manner,
controlling the display unit to display one or more selectable selection buttons, other than the selected selection button, in the first display manner, and
controlling the image reading unit to start the image reading operation;
wherein the controller is further configured to control the display unit to display the selected selection button corresponding to the intended transmission destination of the image data of the read image in a third display manner, different from the second display manner, during execution of the image reading operation.

2. The image reader according to claim 1,
wherein the controller is further configured to, when a predetermined destination to which the image data of the read image is to be preferentially transmitted is set, control the display unit to display a specific one of the plurality of selection buttons that corresponds to the predetermined destination, in the second manner.

3. The image reader according to claim 1,
wherein the controller is further configured to forbid the display unit from displaying selection buttons other than the selected selection button, after acceptance of the instruction to cause the image reading unit to start the image reading operation.

4. The image reader according to claim 1,
wherein the display unit is further configured to display a start button for starting the image reading operation, and
wherein the controller is further configured to:
control the display unit to display the start button after the selection button corresponding to the intended transmission destination of the image data of the read image is selected; and
control the display unit to display the selected selection button in the third display manner different from the second display manner, after the start button is operated.

5. The image reader according to claim 1,
wherein the display unit is further configured to display a cancel button for canceling the image reading operation, and
wherein the controller is further configured to control the display unit to display the cancel button, after acceptance of the instruction to cause the image reading unit to start the image reading operation.

6. The image reader according to claim 1,
wherein the display unit is further configured to display a start button for starting the image reading operation,
wherein the image reading unit is further configured to perform the image reading operation for a plurality of types of document sheets including a larger-size document sheet and a smaller-size document sheet, and
wherein the controller is further configured to:
when executing the image reading operation for the larger-size document sheet, control the image reading unit to start the image reading operation in response to the start button being operated; and
when executing the image reading operation for the smaller-size document sheet, control the image reading unit to start the image reading operation without the start button being operated.

7. The image reader according to claim 1, further comprising:
a first insertion port configured to accept a first-size document sheet inserted therethrough; and
a second insertion port configured to accept a second-size document sheet inserted therethrough, the second-size document sheet being smaller than the first-size document sheet in size,
wherein the display unit is further configured to display a start button for starting the image reading operation, and
wherein the controller is further configured to:
when executing the image reading operation for the first-size document sheet inserted through the first insertion port, control the image reading unit to start the image reading operation in response to the start button being operated; and
when executing the image reading operation for the second-size document sheet inserted through the second insertion port, control the image reading unit to start the image reading operation without the start button being operated.

8. The image reader according to claim 1,
wherein the display unit is further configured to display a start button for starting the image reading operation,
wherein the image reading unit is further configured to perform the image reading operation for a plurality of types of document sheets including a softer-material document sheet and a harder-material document sheet, and
wherein the controller is further configured to:
when executing the image reading operation for the softer-material document sheet, control the image reading unit to start the image reading operation in response to the start button being operated; and
when executing the image reading operation for the harder-material document sheet, control the image reading unit to start the image reading operation without the start button being operated.

9. The image reader according to claim 1, further comprising:
a first insertion port configured to accept a first-material document sheet inserted therethrough; and
a second insertion port configured to accept a second-material document sheet inserted therethrough, the second-material document sheet being of a material harder than a material of the first-material document sheet, wherein the display unit is further configured to display a start button for starting the image reading operation, and wherein the controller is further configured to:

when executing the image reading operation for the first-material document sheet inserted through the first insertion port, control the image reading unit to start the image reading operation in response to the start button being operated; and when executing the image reading operation for the second-material document sheet inserted through the second insertion port, control the image reading unit to start the image reading operation without the start button being operated.

10. A method configured to be implemented on a processor connected with:

an image reading unit configured to perform an image reading operation of reading an image of a document sheet and creating image data of the read image; and a display unit configured to display a plurality of selection buttons corresponding to respective devices, each selection button being configured to, when selected, set a corresponding device as an intended transmission destination of the image data of the read image, the method comprising:

controlling, before a selection button corresponding to the intended transmission destination of the image data of the read image is selected, the display unit to display one or more selectable selection buttons of the plurality of selection buttons in a first display manner, the one or more selectable selection buttons corresponding to accessible devices to which it is possible to transmit the image data of the read image; and performing, after the selection button corresponding to the intended transmission destination of the image data of the read image is selected, controlling the display unit to display the selected selection button corresponding to the intended transmission destination of the image data of the read image in a second display manner different from the first display manner, controlling the display unit to display one or more selectable selection buttons, other than the selected selection button, in the first display manner, and controlling the image reading unit to start the image reading operation;

wherein the controlling further comprises controlling the display unit to display the selected selection button corresponding to the intended transmission destination of the image data of the read image in a third display manner, different from the second display manner, during execution of the image reading operation.

11. A non-transitory computer readable medium storing computer readable instructions configured to be executed by a processor connected with:

an image reading unit configured to perform an image reading operation of reading an image of a document sheet and creating image data of the read image; and a display unit configured to display a plurality of selection buttons corresponding to respective devices, each selection button being configured to, when selected, set a corresponding device as an intended transmission destination of the image data of the read image, the instructions, when executed by the processor, causing the processor to:

control, before a selection button corresponding to the intended transmission destination of the image data of the read image is selected, the display unit to display one or more selectable selection buttons of the plurality of selection buttons in a first display manner, the one or more selectable selection buttons corresponding to accessible devices to which it is possible to transmit the image data of the read image; and perform, after the selection button corresponding to the intended transmission destination of the image data of the read image is selected, controlling the display unit to display the selected selection button corresponding to the intended transmission destination of the image data of the read image in a second display manner different from the first display manner, controlling the display unit to display one or more selectable selection buttons, other than the selected selection button, in the first display manner, and controlling the image reading unit to start the image reading operation;

wherein the instructions, when executed by the processor, further cause the processor to control the display unit to display the selected selection button corresponding to the intended transmission destination of the image data of the read image in a third display manner, different from the second display manner, during execution of the image reading operation.

12. The non-transitory computer readable medium according to claim 11, wherein the instructions, when executed by the processor, further cause the processor to, when a predetermined destination to which the image data of the read image is to be preferentially transmitted is set, control the display unit to display a specific one of the plurality of selection buttons that corresponds to the predetermined destination in the second manner.

13. The non-transitory computer readable medium according to claim 11, wherein the instructions, when executed by the processor, further cause the processor to forbid the display unit from displaying selection buttons other than the selected selection button, after acceptance of the instruction to cause the image reading unit to start the image reading operation.

14. The non-transitory computer readable medium according to claim 11, wherein the display unit is further configured to display a start button for starting the image reading operation, and wherein the instructions, when executed by the processor, further cause the processor to:

control the display unit to display the start button after the selection button corresponding to the intended transmission destination of the image data of the read image is selected; and control the display unit to display the selected selection button in the third display manner different from the second display manner, after the start button is operated.

15. The non-transitory computer readable medium according to claim 11, wherein the display unit is further configured to display a start button for starting the image reading operation, wherein the image reading unit is further configured to perform the image reading operation for a plurality of types of document sheets including a larger-size document sheet and a smaller-size document sheet, and wherein the instructions, when executed by the processor, further cause the processor to:

when executing the image reading operation for the larger-size document sheet, control the image reading unit to start the image reading operation in response to the start button being operated; and when executing the image reading operation for the smaller-size document sheet, control the image reading unit to start the image reading operation without the start button being operated.

16. The non-transitory computer readable medium according to claim 11, wherein the image reading unit is further configured to perform the image reading operation for a first-size document sheet inserted through a first insertion port and a second-size document sheet inserted through a second insertion port, the second-size document sheet being smaller than the first-size document sheet in size, wherein the display unit is further configured to display a start button for starting the image reading operation, and wherein the instructions, when executed by the processor, further cause the processor to:

when executing the image reading operation for the first-size document sheet inserted through the first insertion port, control the image reading unit to start the image reading operation in response to the start button being operated; and when executing the image reading operation for the second-size document sheet inserted through the second insertion port, control the image reading unit to start the image reading operation without the start button being operated.

17. The non-transitory computer readable medium according to claim 11, wherein the display unit is further configured to display a start button for starting the image reading operation, wherein the image reading unit is further configured to perform the image reading operation for a plurality of types of document sheets including a softer-material document sheet and a harder-material document sheet, and wherein the instructions, when executed by the processor, further cause the processor to:

when executing the image reading operation for the softer-material document sheet, control the image reading unit to start the image reading operation in response to the start button being operated; and when executing the image reading operation for the harder-material document sheet, control the image reading unit to start the image reading operation without the start button being operated.

18. The non-transitory computer readable medium according to claim 11, wherein the image reading unit is further configured to perform the image reading operation for a first-material document sheet inserted through a first insertion port and a second-material document sheet inserted through a second insertion port, the second-material document sheet being of a material harder than a material of the first-material document sheet, wherein the display unit is further configured to display a start button for starting the image reading operation, and wherein the instructions, when executed by the processor, further cause the processor to:

when executing the image reading operation for the first-material document sheet inserted through the first insertion port, control the image reading unit to start the image reading operation in response to the start button being operated; and when executing the image reading operation for the second-material document sheet inserted through the second insertion port, control the image reading unit to start the image reading operation without the start button being operated.

* * * * *